(No Model.) 2 Sheets—Sheet 1.

F. W. COOK.
SHIFTER FOR GANG EDGERS.

No. 389,443. Patented Sept. 11, 1888.

Witnesses:
Geo. H. Strong
J. H. Rousse

Inventor,
F. W. Cook
By Dewey & Co.
Attys (No Model.) 2 Sheets—Sheet 2.

F. W. COOK.
SHIFTER FOR GANG EDGERS.

No. 389,443. Patented Sept. 11, 1888.

Witnesses:
Geo. H. Strong,

Inventor,
F. W. Cook
By Dewey & Co
atty

UNITED STATES PATENT OFFICE.

FREDERICK W. COOK, OF SAN FRANCISCO, CALIFORNIA.

SHIFTER FOR GANG-EDGERS.

SPECIFICATION forming part of Letters Patent No. 389,443, dated September 11, 1888.

Application filed May 23, 1888. Serial No. 274,831. (No model.)

*To all whom it may concern:*

Be it known that I, FREDERICK W. COOK, of the city and county of San Francisco, State of California, have invented an Improvement in Shifters for Gang-Edgers; and I hereby declare the following to be a full, clear, and exact description of the same.

My invention relates to the class of gang-edgers, and especially to the shifters for the saws thereof, whereby said saws are moved on their shaft to vary their position according to the work required.

My invention consists in a shaft or rod passing through a bearing in the saw-collar and provided with a pinion on each end, which engages a fixed rack on each side.

The object of my invention is to move the saws by a connection with the hub or collar thereof, and to apply the power to move them to both ends of the adjusting shaft or rod, whereby the adjustment is effected easily and with precision.

Figure 1:
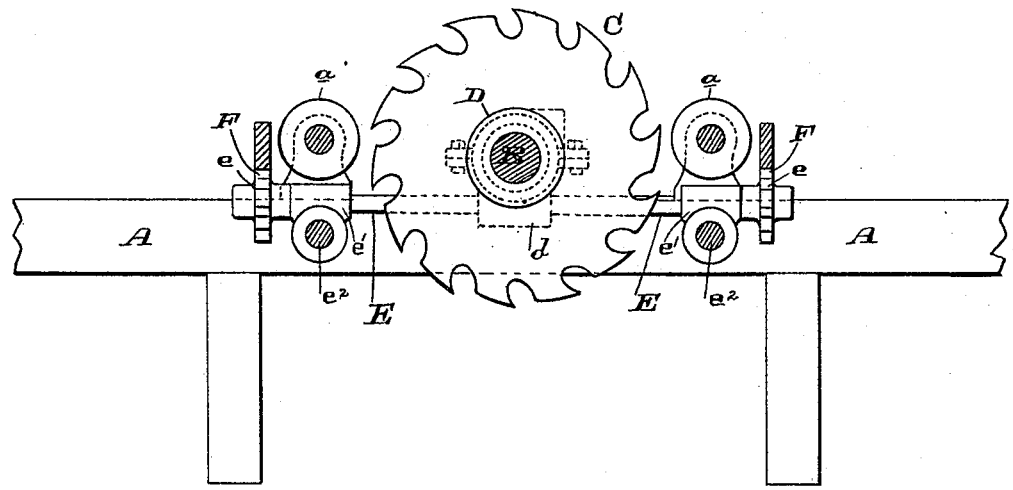
Figure 2:
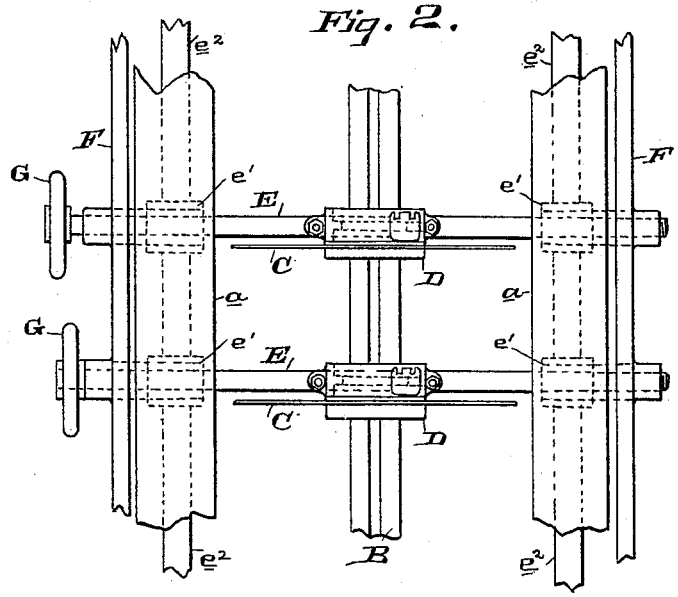
Figure 3:
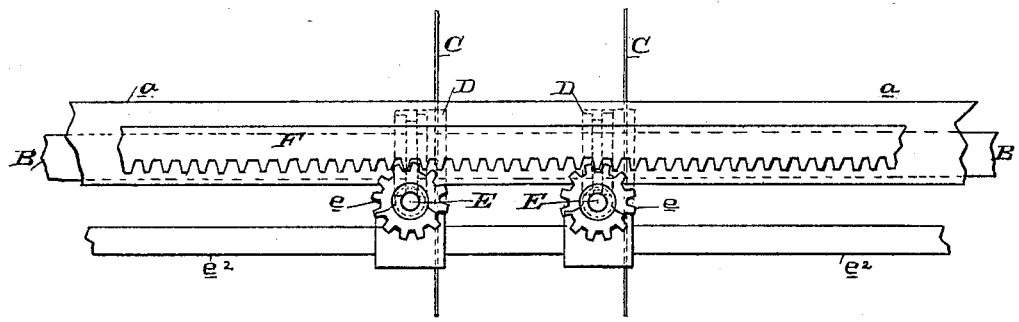
Figure 4:
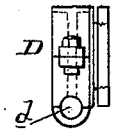

Referring to the accompanying drawings, Figure 1 is a vertical section. Fig. 2 is a plan. Fig. 3 is a front view. Fig. 4 is a front view of one of the saw-collars D.

A is the frame of a gang-edger, of which $a$ are the rolls.

B is the saw arbor or shaft, and C is the saw gang or series. Each saw has a hub or collar, D, which is suitably mounted on the shaft B, as by a feather, so that it rotates with the shaft, but may have a movement sidewise thereon to shift or adjust the saw. The hub D is provided with a socket-bearing, $d$, in its lower portion, in which is fitted a rod or shaft, E, which passes through and extends beyond the saw in front and behind, and is provided with a pinion, $e$, on each end.

Transversely of the frame are secured the racks F both in front of the saws and behind them, and the pinions $e$ engage and travel in these racks. The rods or shafts E have bearing-blocks $e'$, which travel on the fixed tracks or rails $e^2$.

G are crank-wheels for turning shafts E, whereby the pinions are rotated to cause them to travel in the racks, and thus to carry said shafts E over and shift and adjust the saws. It will be seen that by this construction I obtain a hub or center connection, and I also apply the power on both ends of the connection and in front of and behind the saws, so that the adjustment is made with facility and accuracy.

Having thus described my invention, what I claim as new, and desire to secure by Letters Patent, is—

In a gang-edger having laterally-movable saws, a hub for each saw, having a socket-bearing in its base, in combination with the rod or shaft passing through said bearing, and the pinion and rack at each end of said rod or shaft for moving it laterally and adjusting the saw, substantially as herein described.

In witness whereof I have hereunto set my hand.

FREDERICK W. COOK.

Witnesses:
S. H. NOURSE,
H. C. LEE.